US011677696B2

(12) United States Patent
Panchapakesan et al.

(10) Patent No.: US 11,677,696 B2
(45) Date of Patent: *Jun. 13, 2023

(54) ARCHITECTURE FOR PERFORMING ACTION IN A THIRD-PARTY SERVICE BY AN EMAIL CLIENT

(71) Applicant: AIRWATCH LLC, Atlanta, GA (US)

(72) Inventors: Ramani Panchapakesan, Bangalore (IN); Gangadhar Nittala, Bangalore (IN); Noah Wasmer, Atlanta, GA (US)

(73) Assignee: VMware, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,332

(22) Filed: May 13, 2022

(65) Prior Publication Data
US 2022/0278948 A1  Sep. 1, 2022

Related U.S. Application Data

(63) Continuation of application No. 17/340,397, filed on Jun. 7, 2021, now Pat. No. 11,336,599, which is a (Continued)

(51) Int. Cl.
| | |
|---|---|
| *H04L 51/046* | (2022.01) |
| *H04L 51/18* | (2022.01) |
| *H04L 67/01* | (2022.01) |
| *H04L 67/53* | (2022.01) |
| *H04L 67/00* | (2022.01) |
| *H04L 67/30* | (2022.01) |

(52) U.S. Cl.
CPC ............ *H04L 51/046* (2013.01); *H04L 51/18* (2013.01); *H04L 67/01* (2022.05); *H04L 67/34* (2013.01); *H04L 67/53* (2022.05); *H04L 67/30* (2013.01)

(58) Field of Classification Search
CPC ....... H04L 51/046; H04L 51/18; H04L 67/01; H04L 67/34; H04L 67/53; H04L 67/30
See application file for complete search history.

(56) References Cited

U.S. PATENT DOCUMENTS

| | | |
|---|---|---|
| 6,457,009 B1 | 9/2002 | Bollay |
| 6,546,417 B1 | 4/2003 | Baker |

(Continued)

FOREIGN PATENT DOCUMENTS

WO   2007055680   5/2007

OTHER PUBLICATIONS

Anatara Bhattacharya, How to integrate Facebook with Salesforce, Oct. 9, 2014, URL:https://web.archive.org/web/20141009001443/hllp://appshark.com:80/blog/how-to-integrate -facebook-with-salesforce/.

(Continued)

*Primary Examiner* — Javier O Guzman
(74) *Attorney, Agent, or Firm* — Thomas | Horstemeyer, LLP.

(57) ABSTRACT

Disclosed are various approaches performing actions on data items in a third-party service with a network-accessible application programming interface from an email client. The email client can perform an action as specified by an email service profile, which specifies how to identify the email message, the data item and how to interact with the network-accessible application programming interface.

20 Claims, 11 Drawing Sheets

Related U.S. Application Data continuation of application No. 15/343,225, filed on Nov. 4, 2016, now Pat. No. 11,032,220.

(56) References Cited

U.S. PATENT DOCUMENTS

| | | | |
|---|---|---|---|
| 7,330,824 B1 | 2/2008 | Kanojia et al. | |
| 7,392,249 B1 | 6/2008 | Harris et al. | |
| 8,631,065 B2 | 1/2014 | Dargahi et al. | |
| 9,369,333 B1* | 6/2016 | Chiu | G06Q 10/107 |
| 9,460,299 B2 | 10/2016 | Weiss et al. | |
| 9,483,393 B1 | 11/2016 | Suttle et al. | |
| 9,554,197 B2 | 1/2017 | Oh et al. | |
| 9,699,729 B2 | 7/2017 | Lebon-Schneider et al. | |
| 9,774,586 B1 | 9/2017 | Roche et al. | |
| 9,800,711 B2 | 10/2017 | Brown et al. | |
| 9,973,452 B2 | 5/2018 | Dumans | |
| 10,095,676 B2 | 10/2018 | Wetzel et al. | |
| 10,298,635 B2 | 5/2019 | Malatesha et al. | |
| 2002/0035595 A1 | 3/2002 | Yen et al. | |
| 2002/0123983 A1 | 9/2002 | Riley et al. | |
| 2003/0018661 A1 | 1/2003 | Darugar | |
| 2003/0093373 A1 | 5/2003 | Smirnoff et al. | |
| 2004/0043753 A1 | 3/2004 | Wake et al. | |
| 2006/0075043 A1 | 4/2006 | Chen et al. | |
| 2006/0136811 A1 | 6/2006 | Burago et al. | |
| 2006/0277166 A1 | 12/2006 | Vogler-Ivashchanka et al. | |
| 2007/0094042 A1 | 4/2007 | Ramer et al. | |
| 2007/0157113 A1 | 7/2007 | Bishop et al. | |
| 2007/0291911 A1 | 12/2007 | Visser | |
| 2008/0005247 A9 | 1/2008 | Khoo | |
| 2009/0228807 A1 | 9/2009 | Lemay | |
| 2009/0271283 A1 | 10/2009 | Fosnacht et al. | |
| 2010/0100778 A1 | 4/2010 | Sullivan | |
| 2010/0305855 A1 | 12/2010 | Dutton et al. | |
| 2011/0105154 A1 | 5/2011 | Kim | |
| 2011/0179362 A1 | 7/2011 | Craddock et al. | |
| 2011/0282969 A1 | 11/2011 | Iyer et al. | |
| 2013/0074038 A1* | 3/2013 | Fox | G06F 8/71 717/122 |
| 2013/0086597 A1 | 4/2013 | Cornwall et al. | |
| 2013/0111500 A1* | 5/2013 | Dixon | G06F 9/546 719/314 |
| 2013/0159432 A1 | 6/2013 | Deering et al. | |
| 2013/0173727 A1 | 7/2013 | Libin et al. | |
| 2013/0219365 A1 | 8/2013 | Rago et al. | |
| 2014/0040756 A1 | 2/2014 | Bukurak et al. | |
| 2014/0052797 A1 | 2/2014 | Lessard et al. | |
| 2014/0095894 A1 | 4/2014 | Barton et al. | |
| 2014/0100871 A1 | 4/2014 | Toleti et al. | |
| 2014/0129942 A1 | 5/2014 | Rathod | |
| 2014/0215312 A1 | 7/2014 | Hicks et al. | |
| 2014/0236649 A1 | 8/2014 | Hamid et al. | |
| 2014/0245176 A1* | 8/2014 | Murali | H04L 51/42 715/752 |
| 2014/0245178 A1* | 8/2014 | Smith | H04L 51/216 715/753 |
| 2014/0278935 A1 | 9/2014 | Gara | |
| 2014/0282254 A1 | 9/2014 | Feiereisen et al. | |
| 2014/0337441 A1 | 11/2014 | Schnitman et al. | |
| 2014/0344273 A1 | 11/2014 | Haines | |
| 2015/0007048 A1 | 1/2015 | Dumans | |
| 2015/0143258 A1* | 5/2015 | Carolan | H04L 51/18 715/752 |
| 2015/0149552 A1 | 5/2015 | Oh et al. | |
| 2015/0271118 A1 | 9/2015 | Nudel et al. | |
| 2015/0319123 A1 | 11/2015 | Dumans | |
| 2015/0350134 A1 | 12/2015 | Yang et al. | |
| 2016/0055079 A1 | 2/2016 | Hanna | |
| 2016/0320926 A1 | 11/2016 | Ganin et al. | |
| 2016/0328097 A1 | 11/2016 | Ganin et al. | |
| 2016/0379279 A1 | 12/2016 | Ashery et al. | |
| 2017/0091159 A1 | 3/2017 | Su et al. | |
| 2017/0346811 A1 | 11/2017 | Newell et al. | |

OTHER PUBLICATIONS

Boxer, Boxer for Android—A Better Inbox, Sep. 2, 2014, Youtube.com, URL: https://www.youtube.com/watchv=ZO-rkDeeeCc (Year: 2014).

Fagerberg, "Optimizing clients with API gateways", 2015, ISSN 1650-2884, pp. 1-65 (Year: 2015).

Josuttis, "SOA in Practice", O'Reilly, pp. 1-303. (Year: 2007).

OurSalesForceAdmin, Setting up Outlook Salesforce Sync, Jun. 15, 2014 Youtube.com, URL: https://www.youtube.com/watchv=xMptKztxYg4.

Sales force, Using the Sales force Side Panel to Work with Records in Microsoft Outlook, May 17, 2013, Youtube.com, URL:https://www.youtube.com/watchv=ffzF-WYmS0g (Year: 2013).

Salesforce App for Outlook, Aug. 30, 2015, URL:hllps://web.archive.org/web/20150830163042/https://releasenotes.:docs.salesforce.com/enus/winter16/releasenotes/rn sales_ email_ connect_ salesforceapp for_ outlook.htm (Year: 2015).

* cited by examiner

ARCHITECTURE FOR PERFORMING ACTION IN A THIRD-PARTY SERVICE BY AN EMAIL CLIENT

CROSS-REFERENCE TO RELATED APPLICATION

This application is a continuation of U.S. patent application Ser. No. 17/340,397, entitled "ARCHITECTURE FOR PERFORMING ACTION IN A THIRD-PARTY SERVICE BY AN EMAIL CLIENT," filed Jun. 7, 2021, which is a continuation of U.S. patent application Ser. No. 15/343,225, entitled "ARCHITECTURE FOR PERFORMING ACTIONS IN A THIRD-PARTY SERVICE BY AN EMAIL CLIENT," filed Nov. 4, 2016, which are hereby fully incorporated by reference.

BACKGROUND

Users in an enterprise environment can receive large volumes of email. Some email is generated by third-party services, such as content management systems, source code repositories, salesforce tools, finance tools, or other cloud or network-accessible services. If an email is generated by one of these services is sent to a user's inbox, there might be one or more actions that the user can take in response. In this scenario, the user is required to open the email message, potentially follow a uniform resource locator (URL), open a browser or application associated with the third-party service, and perform an action on a particular data item within the third-party service in a browser or application window separate from the email client.

The above process can be time-consuming and tedious for users. For example, in scenarios where users receive many emails from a particular third-party service, each of which requires some action by the user, taking an action in response to each of the emails can, for each email, require the user to open the email, follow a URL, take an action in an application separate from an email client, switch contexts back to the email client, and find the next email that requires action. Additionally, third-party services can vary and modify messaging protocols and application programming interfaces (APIs) over time, rendering it difficult to preconfigure an email client with the ability to take actions on data items in a third-party service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a pluggable architecture that facilitates taking actions on data items in a network-accessible third-party service from an email client. Third-party services can generate email notifications or alerts that are sent to users. These email messages can include a uniform resource locator (URL) or other type of link that directs a user to a browser page or another application installed on a user's device in which the user can view additional information or take a particular action. For example, an email message from a cloud-based software bug repository can include information about a submitted bug and a link to a page in the cloud-based bug repository, where the user can perform an action with respect to the reported bug. For example, once the user follows the link, the bug repository might request the user to authenticate his or her credentials and then present additional links or user interface elements through which the user can take an action with respect to the bug. In this scenario, the user might be able to assign the bug to a developer on his or her team, escalate the bug, close a trouble ticket associated with the bug, or perform any other action that is provided for by the bug repository.

As another example, a billing service can generate emails for bills that must be approved, denied, delegated, etc. An email notification about a particular bill can be sent to a user, and the email might include some information about the particular bill as well as a link to a website associated with the billing service or to an application installed on a user's device. The web page or application of the billing service can allow a user to approve the bill for payment, deny payment, or perform any other action that is provided by the billing service.

Examples of the disclosure can allow developers of third-party services or an email client to define email service profiles that define one or more actions that can be taken with respect to an email in a third-party service that is separate from the user's email account. For example, the email client can perform an action with respect to a bug in the cloud-based bug repository on behalf of the user. The email client can perform an action in the billing service on behalf of the user with respect to a bill in the billing service.

Figure 1A:
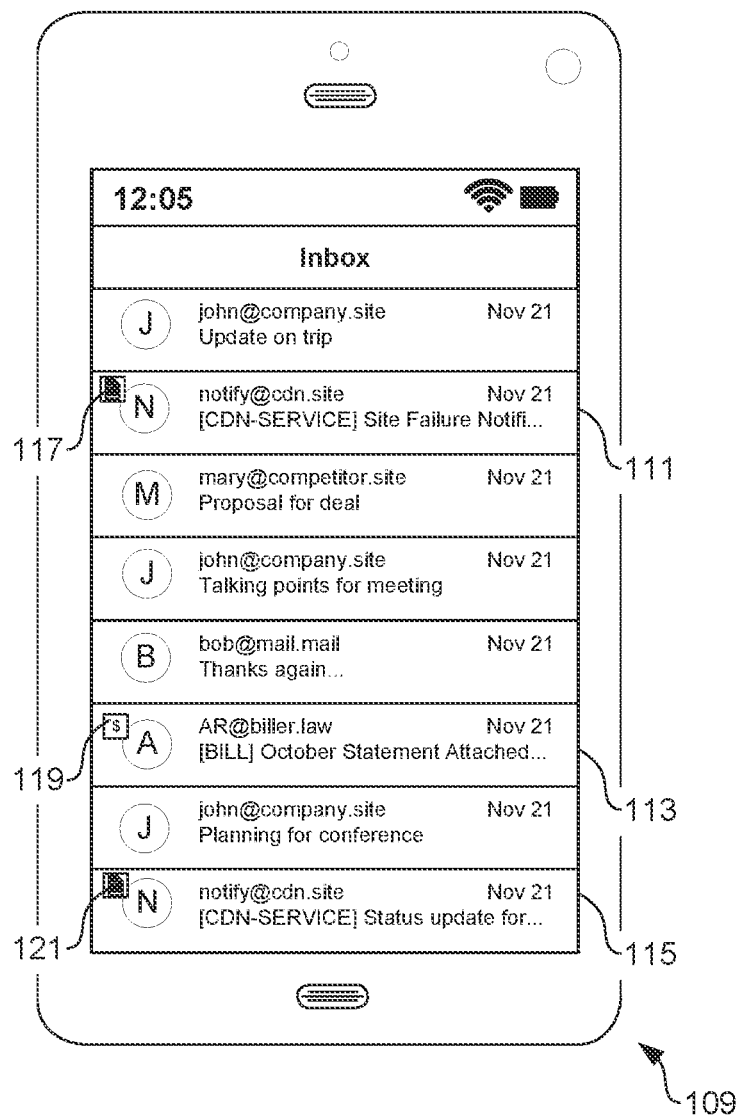
FIGS. 1A-1E depict example user interfaces generated by an email client according to various examples of the disclosure.

To this end, FIG. 1A illustrates an example of a mailbox view generated by an email client 109 according to one example of the disclosure. In the example of FIG. 1A, the email client 109 can be executed by a client device that is enrolled as a managed device with a management service. The operating system of the client device can provide API's that allow the client device to be enrolled as a managed device and provide the ability for a remotely executed management service, in coordination with a locally executed management component, to manage and oversee operation of the client device. Accordingly, the email client 109 can be installed as a managed application that is managed by the management service.

In the example of FIG. 1A, the email client 109 can identify emails that are generated by or associated with a third-party service. In the example of FIG. 1A, emails 111, 113, and 115 are identified by the email client 109 as being associated with respective third-party services. Accordingly, the email client 109 can render an icon 117, 119, and 121 that indicates to a user that the emails 111, 113, and 115 are associated with third-party services and that one or more actions can be taken by the email client 109 in the respective third-party services on behalf of the user.

The email client 109 can identify the emails 111, 113, and 115 based upon one or more email service profiles that are installed on the client device and define how emails sent from a particular third-party service can be identified. In one example, the email service profile can specify that an email from a particular third-party service can be identified based upon a particular sender or recipient address. In other words, the email service profile can specify that an email sent from or to a particular sender address is linked with a particular third-party service. In another example, the email service profile can specify that an email subject or body containing a particular string or string pattern is associated with the third-party service. The email service profile can specify a particular regular expression that the email client 109 can interpret to identify whether the string pattern or particular string exists in the text associated with the email.

The email service profile can also contain an icon or a reference to an icon that the email client 109 can render in the user interface to indicate to the user which emails are associated with a particular service. Additionally, the email service profile can specify one or more actions that the email client 109 can take on behalf of the user in the third-party service. In one example, selections of these one or more actions can be displayed in response to a gesture that the email client 109 can detect. For example, if the user performs a swipe or tap gesture on one of the emails 111, 113, or 115, the email client 109 can display one or more actions that the email client 109 can take on behalf of the user in the third-party service. The one or more actions can be specified by the email service profile.

In one example, a user of the email client 109 can configure an email service profile to specify which gestures are associated with which actions. In another example, an administrator of the management service 212 can configure an email service profile to specify which gestures are associated with which actions. In any case, the email service profile can specify one or more gestures that, when performed on the client device 206, cause one or more actions to be available for selection or be taken at the third-party service.

Figure 1B:
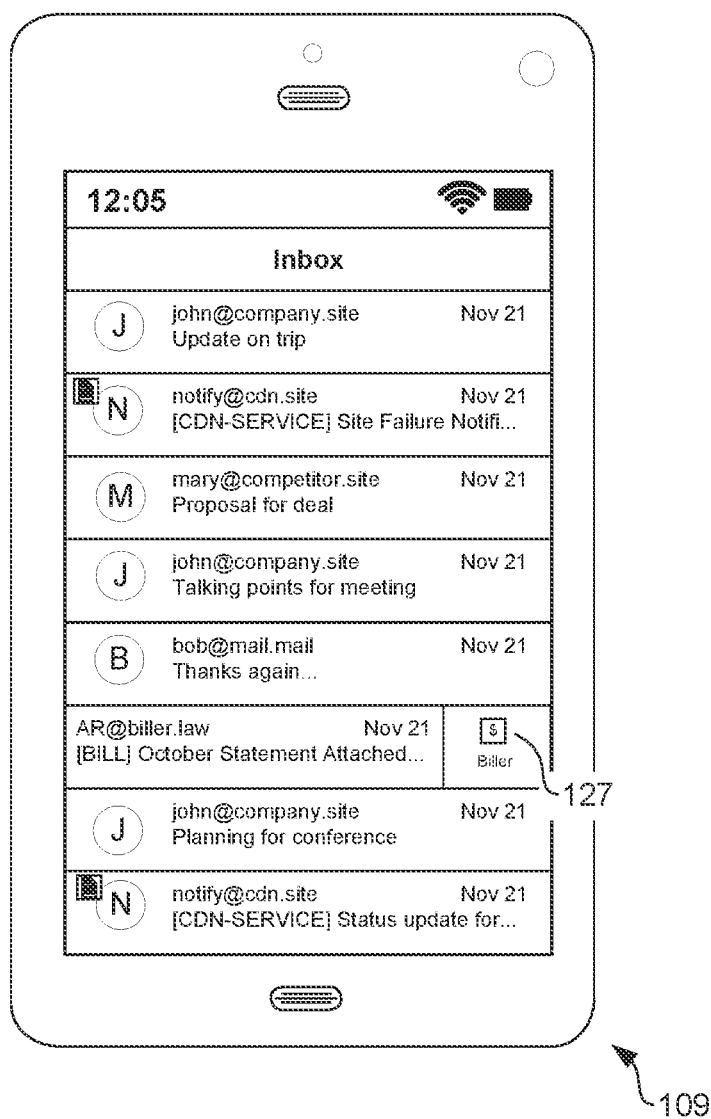

Accordingly, reference is now made to FIG. 1B, which illustrates an example of how the email client 109 can update a mailbox view in response to detecting a particular gesture on an email message 115 associated with a third-party service. In the example of FIG. 1B, the email client 109 can display an additional icon 127 when the email message 115 is swiped to a side. This icon 127 can indicate to the user that the email client 109 can perform the one more actions on behalf of the user within the third-party service. The email client 109 can perform the action by communicating with a network-accessible API provided by the third-party service.

Figure 1C:
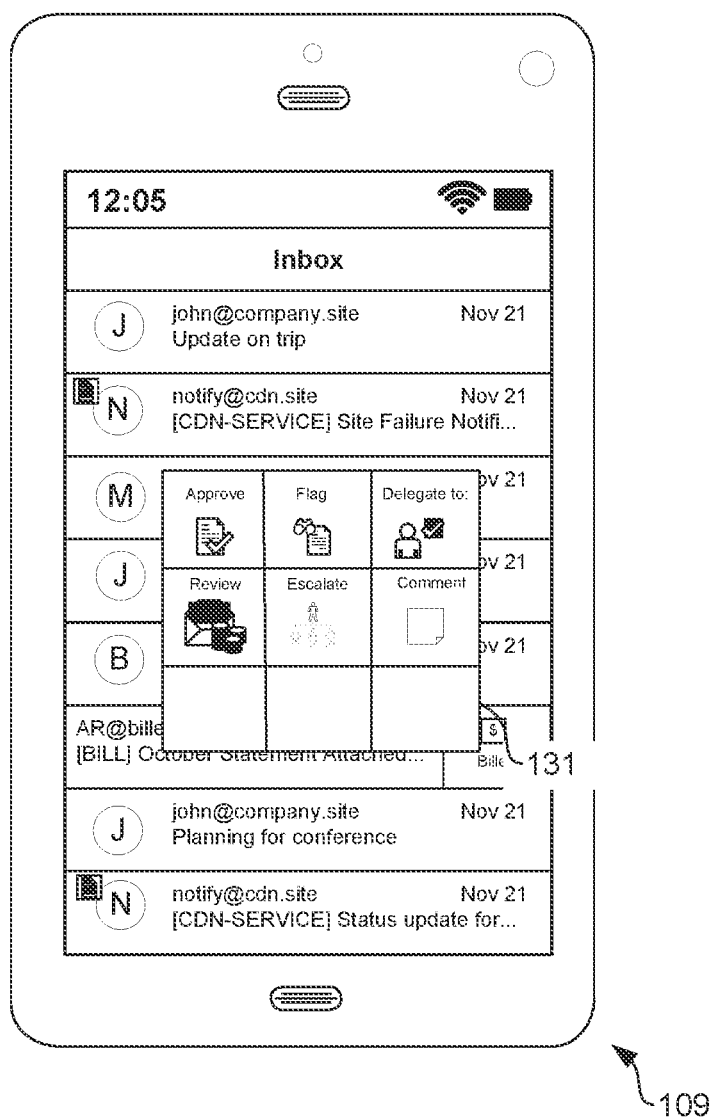

Continuing the example of FIG. 1B, reference is now made to FIG. 1C, which illustrates an example of a user interface element or window 129 that the email client 109 can generate in response to detecting a particular gesture on the email message 115. In one example, the email service profile can specify a layout for the window 129 by identifying one or more native user interface controls provided by the operating system of the client device, which can populate the window 129. The layout can include a user interface element, such as a button, that, when activated by the user, can cause an action to be performed within the third-party service by the email client 109. The email service profile can also specify an icon, text, and executable code associated with each of the actions in the layout of the window 129. The executable code can execute a command within the third-party service using a network-accessible API of the third-party service.

In one scenario, the email client 109 can provide text of the email, such as the subject and/or the body, to the executable code within the email service profile from which the executable code can identify a particular data item within the third-party service. For example, the executable code specified by the email service profile can extract an identifier for a particular bug in a bug management system or a biller within a billing service from the text of the email. In this way, the executable code associated with an email service profile can submit the identifier for a selected action to the third-party service through the network-accessible API of the third-party service.

In another scenario, the email service profile can specify a URL that the email client 109 can render within a web view window facilitated by a web view API of the operating system of the client device. In this scenario, the email client 109 can provide a portion of the text of the email, such as the subject and/or body, as a parameter to a URL specified by email service profile. The third-party service can render a layout of the window 129 within the web view component, which can include links to the various actions that are displayed therein.

Figure 1D:
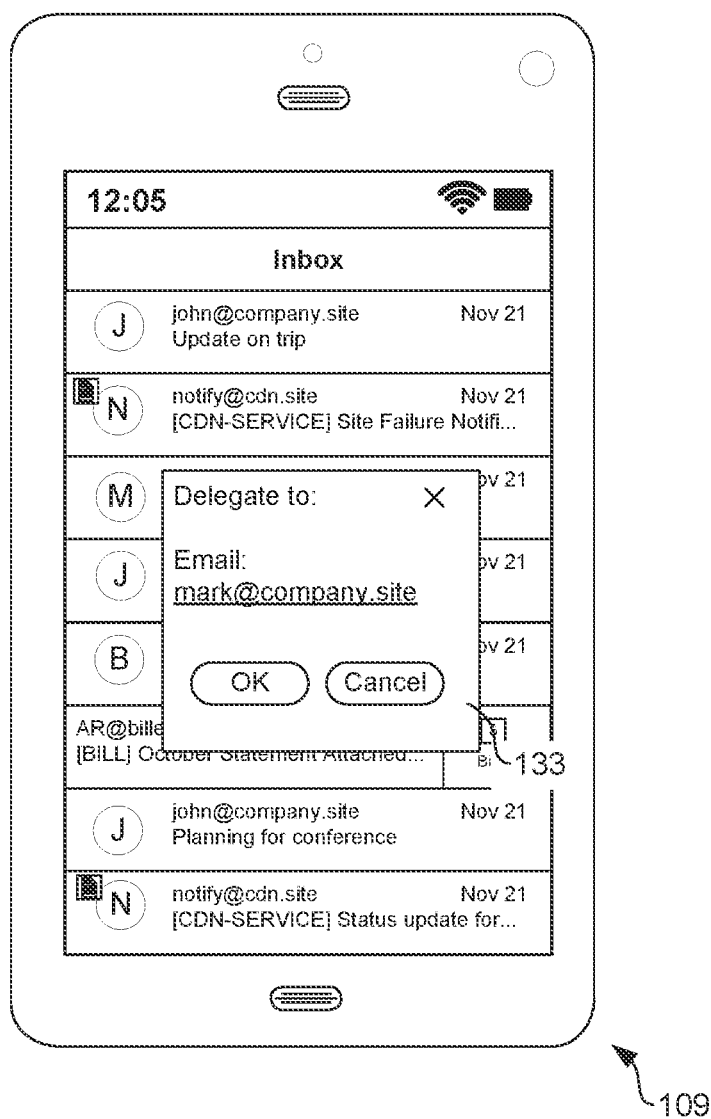

Continuing the example of FIG. 1C, reference is now made to FIG. 1D. In the example of FIG. 1D, a user has selected one of the actions within the window 131 of FIG. 1C. In this example, the selected action requires additional data entry or input from the user. Accordingly, the email service profile can specify additional content that can be displayed by the email client 109 or an additional URL that can be requested and rendered by a web view component of the operating system of the client device.

Figure 1E:
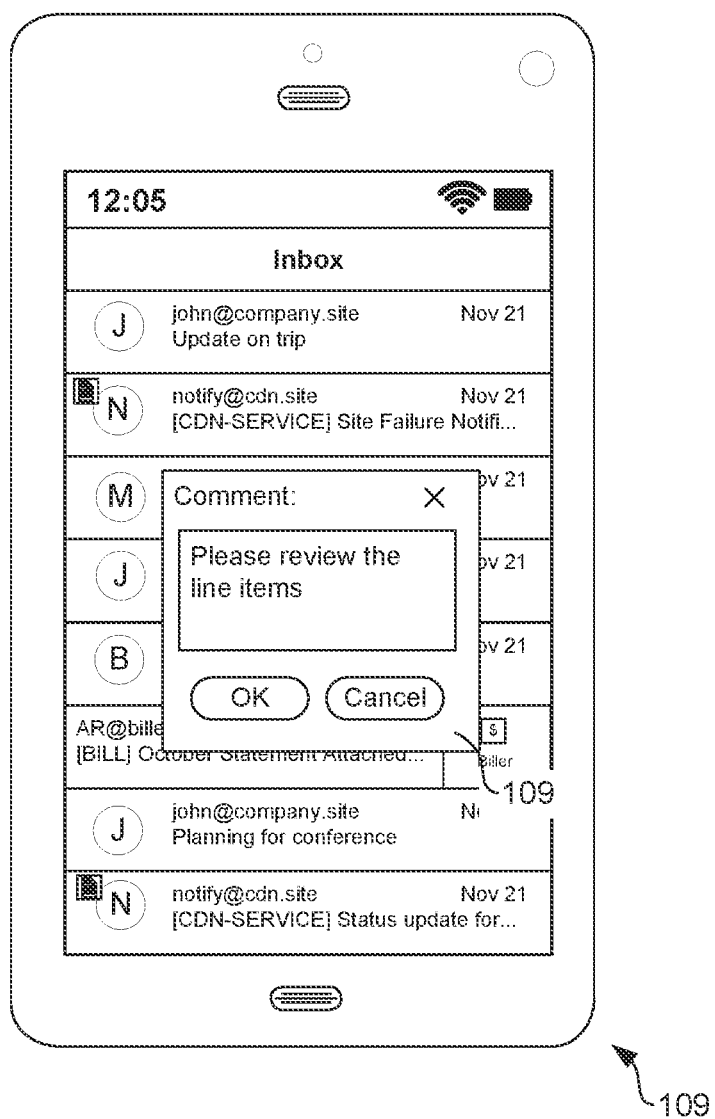

FIG. 1E presents an alternative scenario. In the example of FIG. 1E, the user has selected a different action in the window 131 of FIG. 1C. In response, the email client 109 can render the content in the depicted window 135 as directed by the email service profile corresponding to the third-party service, whether the content is rendered in response to a URL in a web view component or native user interface controls specified by the email service profile.

The email service profile facilitating the experience represented in FIGS. 1A-1E can vary depending upon the third-party service. Additionally, the email service profiles can be updated as needed when the network-accessible API of the third-party service changes or as the manner in which the email client 109 can identify an email associated with a third-party service changes. In this way, a pluggable architecture is provided in which various email service profiles can be installed on a client device so that they are accessible by the email client 109 and from which the email client 109 can identify email associated with third-party services. The email client 109 can also render user interface elements allowing a user to take action on data items within a third-party service over a network-accessible API without having to leave or exit the email client 109, thereby making the process of taking actions on an email message a more efficient process.

Figure 2:
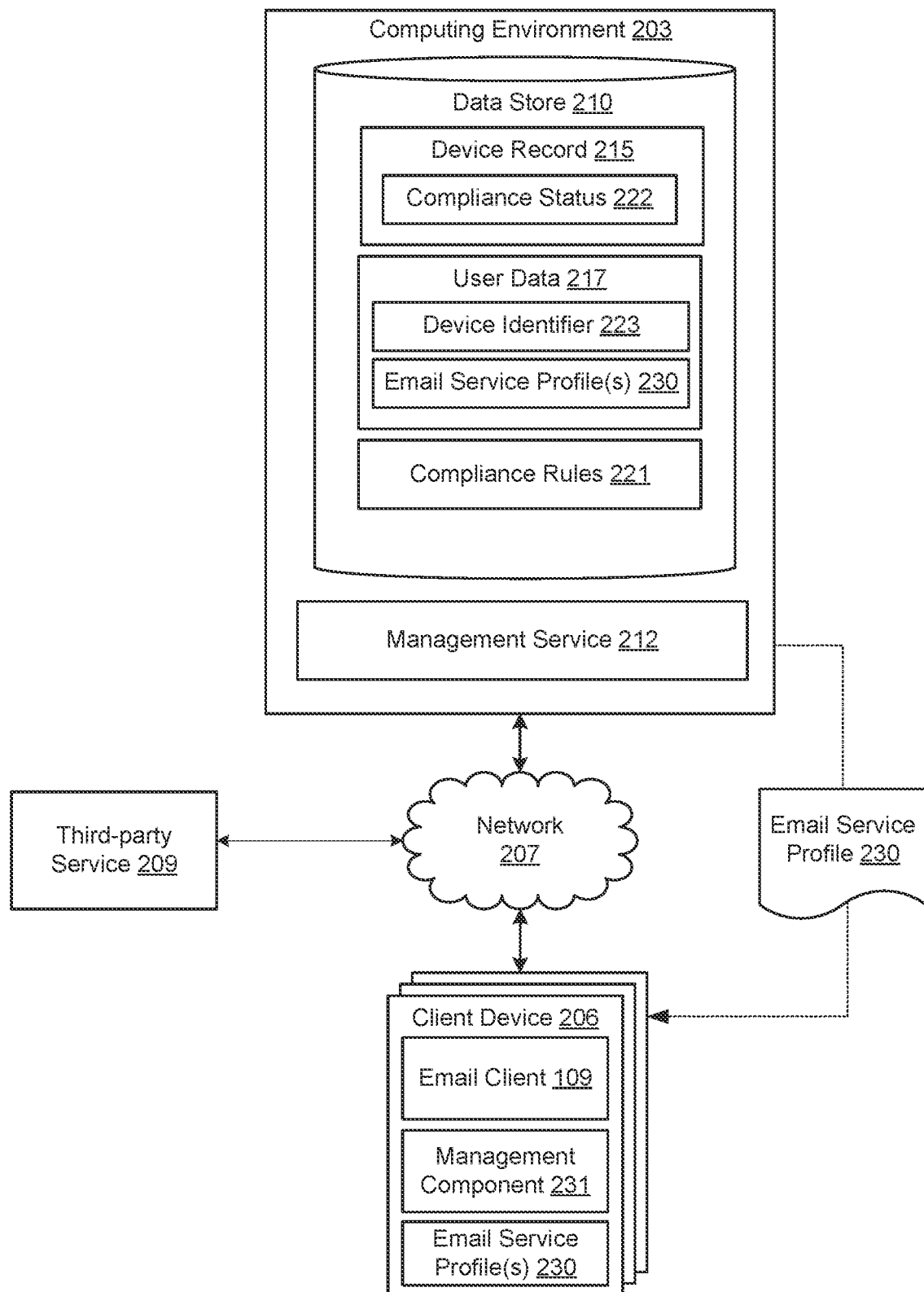
FIG. 2 depicts a networked environment according to various examples of the disclosure.

Referring next to FIG. 2, shown is an example of a networked environment 200 according to examples of the disclosure. In the depicted networked environment 200, a computing environment 203 is in communication with at least one client device 206 and a third-party service 209 over a network 207.

The network 207 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The computing environment 203 can be a computing environment that is operated by an enterprise, such as a business or other organization. The computing environment 203 includes a computing device, such as a server computer, that provides computing capabilities. Alternatively, the computing environment 203 can employ multiple computing devices that are arranged in one or more server banks or computer banks. In one example, the computing devices can be located in a single installation. In another example, the computing devices for the computing environment 203 can be distributed among multiple different geographical locations. In one case, the computing environment 203 includes multiple computing devices that together can form a hosted computing resource or a grid computing resource. Additionally, the computing environment 203 can operate as an elastic computing resource where the allotted capacity of computing-related resources, such as processing resources, network resources, and storage resources, can vary over time. In other examples, the computing environment 203 can include or be operated as one or more virtualized computer instances that can be executed to perform the functionality that is described herein.

Various applications or other functionality can be executed in the computing environment 203. Also, various data can be stored in a data store 210 that can be accessible to the computing environment 203. The data store 210 can be representative of a plurality of data stores 210. The data stored in the data store 210 can be associated with the operation of the various applications or functional entities described below.

The components executed on the computing environment 203 can include a management service 212 and other applications, services, processes, systems, engines, or functionality not discussed in detail herein. The management service 212 can be executed in the computing environment 203 to monitor and oversee the operation of one or more client devices 206 by administrators. In some examples, the management service 212 can represent one or more processes or applications executed by an enterprise mobility management (EMM) provider that facilitates administration of client devices 206 of an enterprise that are enrolled with the EMM provider. To this end, the operating system and application ecosystem associated with the client device 206 can provide various APIs and services that allow client devices 206 to be enrolled as managed devices with the management service 212. The management service 212 can initiate installation of applications as managed applications. The management service 212 can also initiate installation of configuration profiles that can be accessed by certain applications installed on a client device 206.

The management service 212 can include a management console that can allow administrators to manage client devices 206 that are enrolled with the management service 212. User interfaces can allow an administrator to define policies for a user account or devices associated with an enterprise environment. The user interfaces can also include, for example, presentations of statistics or other information regarding the client devices 206 that can be managed by the management service 212.

The management service 212 can generate and install email service profiles 230 on an enrolled client device 206. The email service profiles 230 can be installed as a configuration profile using management APIs provided by an operating system of the client device 206. The management service 212 can communicate with a management component 231 installed on the client device 206 that locally enforces compliance rules 221 associated with the client device 206 and that can manage configuration profiles and other data that is installed on the client device 206 using management APIs.

The data stored in the data store 210 can include device records 215, user data 217, compliance rules 221, and potentially other data. Device records 215 can include correspond to client devices 206 that are enrolled as managed devices with the management service 212. A device record 215 can include various security settings selected for enforcement on a client device 206 that is enrolled with the management service 212. Accordingly, a device record 215 can include a device identifier associated with a device, such as the client device 206, one or more device certificates, a compliance status 222, and other data. In some examples, a device record 215 can also identify a user associated with a particular client device 206. The compliance status 222 can indicate whether a particular client device 206 is in compliance with one or more compliance rules 221.

A device record 215 can also store other device specific information, such as a device type, operating system type or version, applications that are required or optional for the device, or an enrollment status of the device. In this scenario, the device record 215 can also indicate whether a managed device is a computing device or a peripheral device, such as a printer, scanner, or other device that can be deployed in an environment and associated with a record in a directory service.

A compliance status 222 of a client device 206 represents whether the device is in compliance with one or more compliance rules 221. Various compliance rules 221 can be enforced by the management service 212 by the client device 206. Compliance rules 221 can be based on time, geographical location, or device and network properties. For instance, the client device 206 can satisfy a compliance rule 221 when the client device 206 is located within a particular geographic location. The client device 206 can satisfy a compliance rule 221 in other examples when the client device 206 is in communication with a particular local area network, such as a particular local area network that is managed by the computing environment 203. Furthermore, a compliance rule 221 in another example can be based upon the time and date matching specified values.

A compliance rule 221 can specify that a client device 206 is required to be off or in a low power "sleep" state during a specified time period. Another compliance rule 221 can specify that a client device 206 is required to be on or in a normal operation "awake" state during a specified time period. As another example, a compliance rule 221 can specify that a client device 206 is prohibited from rendering content that has been designated as confidential.

Another example of a compliance rule involves whether a user belongs to a particular user group. For instance, a compliance rule 221 can include a whitelist or a blacklist that specifies whether particular users or groups of users are authorized to perform various functionalities, such as installing or executing a particular application.

Other examples of compliance rules 221 include a rule that specifies whether a client device 206 is compromised or "jailbroken." For example, a client device 206 can have hardware or software protections in place that prevent unauthorized modifications of the client device 206. If these protections are overridden or bypassed, the client device 206 can be considered out of compliance. As another example, a compliance rule 221 can specify that the client device 206 is required to prompt a user for a password or personal identification number (PIN) in order to unlock the device.

A compliance rule 221 can also require that the client device 206 have device encryption enabled, where data stored on the device is stored in an encrypted form. The data can be encrypted by a device certificate. A compliance rule 221 can also specify that the client device 206 is enrolled with the management service 212 as a managed device. Another compliance rule 221 can specify that the user is required to accept the terms of service that are presented by the management component 231 on the client device 206. As another example, a compliance rule 221 can specify that the management component 231 is required to periodically communicate or "check-in" with the management service 212 to report on its status. If a threshold amount of time has elapsed since the previous check-in of the client device 206, the device can be considered to have violated this compliance rule 221.

Another compliance rule 221 can specify that a client device 206 be running one of a specified variants or versions of a particular operating system. A compliance rule 221 can also specify that an enrolled device be manufactured by a particular manufacturer or have a particular manufacturer identifier. Another compliance rule 221 can specify that an enrolled device be a particular model name or model number. A client device 206 can also be considered out of compliance if the device is in a data roaming mode or has used a threshold amount of a periodic network data usage allowance.

A compliance rule 221 can also identify a list of required applications that must be installed on the client device 206 or a list of forbidden applications that cannot be installed on the client device 206. The management component 231 can remove a forbidden application or install a missing required on application on the client device 206 in response to detecting a violation of such a compliance rule 221. A compliance rule 221 can also require the presence of a mobile device management (MDM) profile, an MDM storage area, an application profile, and/or a configuration profile. The management component 231 can obtain and store missing required data or containers on the client device 206 in response to detecting a violation of such a compliance rule 221.

Therefore, the compliance status 222 indicates whether and to what extent a particular client device 206 is compliant with compliance rules 221 assigned to the client device 206 by the management service 212. The compliance status 222 can be determined by a management component 231 on the client device 206 that analyzes the status of the client device 206 and reports compliance to the management service 212. In other examples, the compliance status 222 can be determined by the management service 212 based upon information about the status of the client device 206 that is reported by the management component 231.

User data 217 contains information about users who are associated with client devices 206 that are enrolled with the management service 212. User data 217 can include profile information about a user, authentication information about a user, applications that are installed on client devices 206 associated with the user, and other user information. For example, user data 217 can include information about client devices 206 that are associated with a user account of the user, enterprise resources to which a particular user has access, such as email, calendar data, documents, media, applications, network sites, or other resources. The user data 217 can also identify one or more user groups of which a particular user is a member, which can in turn define the access rights of the user to one or more enterprise resources as well as identify which applications should be deployed to a client device 206 associated with the user. To this end, the user data 217 can further identify one or more device identifiers 223 that can uniquely identify client devices 206 that are associated with a user account of the user.

The user data 217 can also include one or more email service profiles 230 that are associated with a user or a user's installation of an email client 109 on a client device 206. As noted above, the email service profile 230 can define the manner in which an email associated with a particular third-party service can be detected. The email service profile 230 can also include or specify an icon that the email client 109 can display in association with an email message linked with the third-party service. The email service profile 230 can also include an authentication credential, such as an authentication token, that authenticates a particular user with the third-party service.

The email service profile 230 can define the layout of a user interface or windows that can be displayed in response to detecting a particular gesture made on the email message 209 within a mailbox view in the email client 109. The email service profile 230 can also include executable code that specifies how the email client 109 can take a particular action on a data item within the third-party service. In another scenario, the email service profile 230 can define a URL or a link to content generated by the third-party service that is displayed within a web view component within the email client 109.

The client device 206 can represent multiple client devices 206 coupled to the network 207. The client device 206 includes, for example, a processor-based computer system. According to various examples, a client device 206 can be in the form of a desktop computer, a laptop computer, a personal digital assistant, a mobile phone, a smartphone, or a tablet computer system. The client device 206 can represent a device that is owned or issued by the enterprise to a user, or a device that is owned by the user. The client device 206, when provisioned, can be enrolled with the management service 212 as a managed device of the enterprise.

The client device 206 can execute a management component 231 that can communicate with the management service 212 to facilitate management of the client device 206. The management component 231 can communicate with the management service 212 to enforce management policies and compliance rules on the client device 206. For example, the management component 231 can enforce data security requirements, install, remove or update security certificates, or write, modify or delete certain data from the client device 206. The management component 231 can also monitor network activity of the client device 206, the location of the client device 206, enforce password or personal identification number (PIN) requirements, or any other security or acceptable-use policies that are defined in the management service 212 and sent to the management component 231 over the network 207.

To carry out local management of a client device 206, the management component 231 can be installed and executed with elevated or administrative privileges on the client device 206. In some scenarios, the operating system can allow a particular application or package to be identified as a device owner or a device administrator.

The email client 109 can also be installed on the client device 206. As a managed device that is enrolled with the management service 212, the email client 109 can be installed by the management service 212. In one scenario, the management service 212 can send a request to the management component 231 to retrieve and install the email client 109 on the client device 206. In this sense, installation of the application is initiated by the management service 212. The management service 212 can also provide configuration data for the email client 109 aside from email service profiles 230 that is installed on the client device 206.

For example, the management service 212 can transmit policies or profiles configure a user's email account within the email client 109. Additionally, the management service 212 can transmit email service profiles 230 that can be installed as configuration profiles on the client device 206 using management APIs provided by the operating system of the client device 206. The email service profiles 230 can be restricted such that they are only accessible by the email client 109 and not by other applications using the management APIs.

The third-party service 209 represents one or more servers associated with a service that client device 206 can access over the network 207. For example, a user of the client device 206 might require access to an internet or cloud-based service. The third-party service 209 can provide a network-accessible API that another application or device can use to take actions on data items stored within the third-party service 209. In some examples, the third-party service 209 can require user authentication. In some instances, the third-party service 209 can support federated authentication protocols in which authentication of a user's identity is performed by an identity provider or by an authentication token that can be provided to the client device 206.

An email service profile 230 can be generated by an administrator of the management service 212 or provided by a user in association with the third-party service 209. In one example, the email service profile 230 can be encoded in extensible markup language (XML) or any other markup language. The email service profile 230 can be provided to the management service 212 and updated as and when a network-accessible API of the third-party service 209 changes or as the formatting of email messages associated with the third-party service 209 changes.

Figure 3:
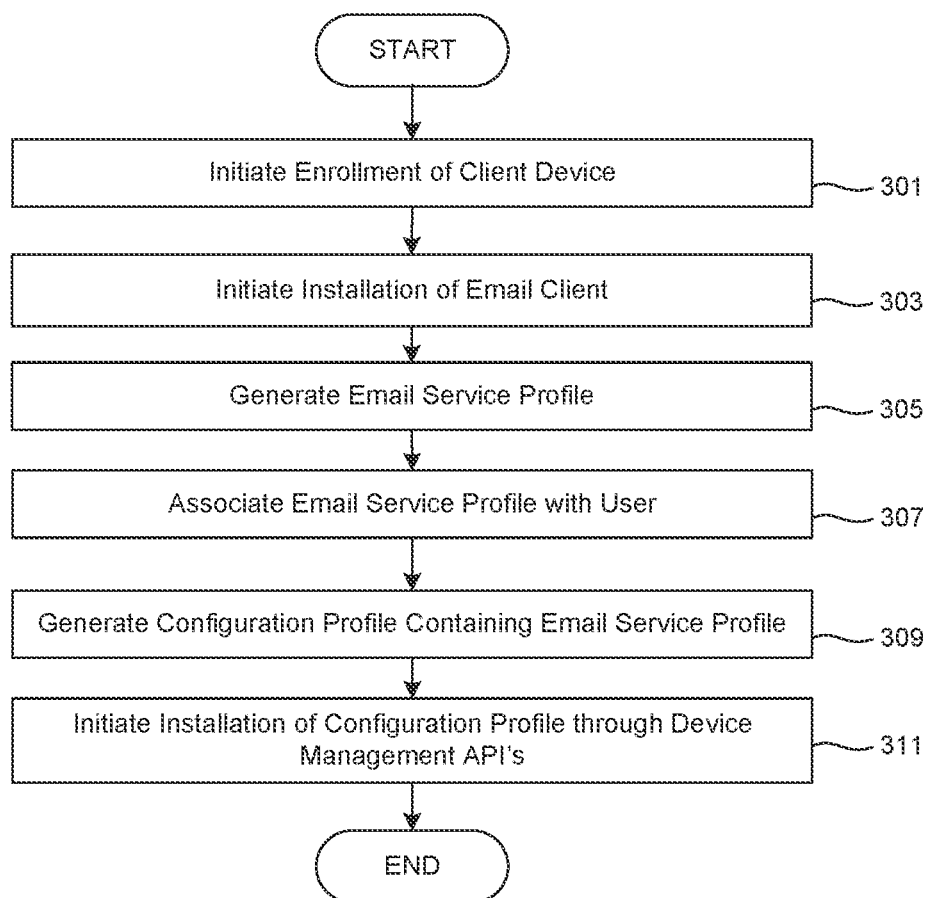
FIGS. 3-7 are flowcharts illustrating functionality according to various examples of the disclosure.

Referring next to FIG. 3, shown is a flowchart that provides one example of how the management service 212 can create and install an email service profile 230 on a client device 206 so that the email client 109 can access the email service profile 230. At step 301, the management service 212 can initiate enrollment of the client device 206 as a managed device. In some examples, the enrollment process is initiated by the client device 206 when a user enters his or her credentials within the enterprise environment in an enrollment client provided by the operating system of the client device 206.

At step 303, upon completion of enrollment of the client device 206 as a managed device, the management service 212 can initiate installation of the email client 109 as a managed application. It is not a global requirement that the email client 109 be installed as a managed application but only one scenario.

Then, at step 305, the management service 212 can generate an email service profile 230 associated with a third-party service 209. In one example, the email service profile 230 is obtained by an administrator of the management service 212 from the third-party service 209.

Next, at step 307, the management service 212 can associate the email service profile with a particular user account within the enterprise. In one example, associating the email service profile with a user account can entail obtaining or generating an authentication token or other credential in the third-party service that can be bundled with the email service profile 230 installed on the user's device.

Then, at step 309, the management service 212 can generate a configuration profile containing the email service profile 230. In one example, the email service profile 230 can be generated by encoding a configuration file using extensible markup language (XML) according to specifications associated with one or more of an email client 109, a management component 231, or an operating system or platform of the client device 206.

Further, at step 311, the management service 212 can initiate installation of the configuration profile using the device management APIs provided by the operating system of the client device 206. In some examples, the management component 231 can install the configuration profile on the client device 206 on behalf of the management service 212. Thereafter, the process proceeds to completion. With one or more email service profiles 230 and the email client 109 installed, emails associated with third-party services can be identified and presented within a mailbox view as herein. Additionally, as a third-party service or a network-accessible API of the service changes or is updated, the email service profile 230 can be updated by the management service 212 by installing a new or updated configuration profile containing an email service profile 230.

Figure 4:
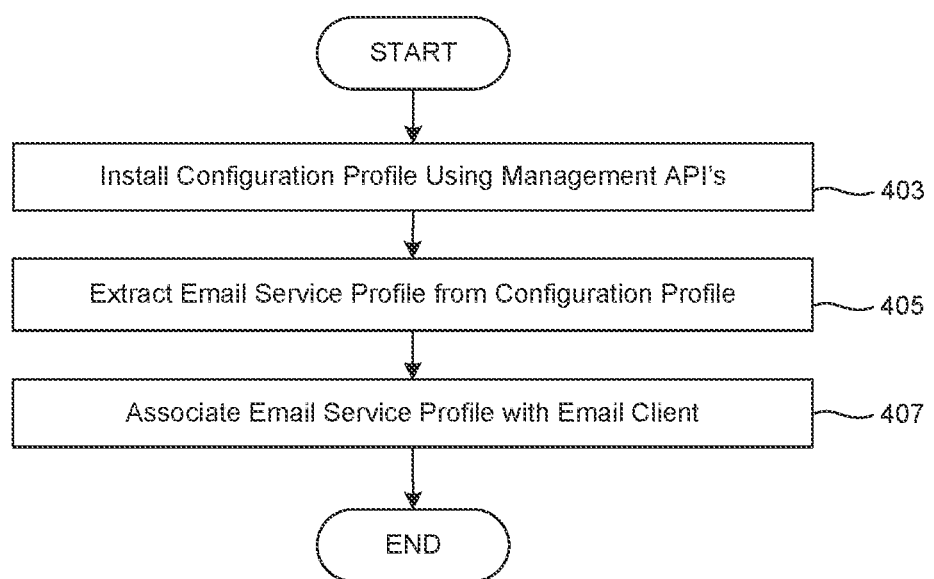
Figure 4:

Referring next to FIG. 4, shown is a flowchart that provides one example of how the management component 231 can install an email service profile 230 obtained from the management service 212.

At step 403, the management component 231 can cause a configuration profile containing an email service profile 230 from the management service 212 to be installed on the client device 206. For instance, the management component 231 can cause the configuration profile to be stored in a memory location of the client device 206 associated with a profile bank or repository that is provided at the operating system level of the software stack of the client device 206. Alternatively, the management component 231 can cause the configuration profile to be installed in a memory location of the client device 206 associated with a particular application, such as the email client 109. In any case, the management component 231 can facilitate installation of the configuration profile on the client device 206 by instructing one or more of the operating system of the client device 206 or a particular application on the client device 206 to perform the installation on its behalf.

Next, at step 405, the management component 231 can cause the email service profile 230 to be extracted from the configuration profile installed on the client device 206. In one example, the management component 231 can instruct one or more of the operating system of the client device 206 or a particular application on the client device 206 (e.g., email client 109) to extract the email service profile 230. Alternatively, the operating system of the client device 206 can automatically extract the email service profile 230 upon the installation of the configuration profile on the client device 206, which can be caused by the management component 231. In any case, the email service profile 230 can be extracted from the configuration profile by parsing the configuration profile for configuration information associated with one or more actions that the email client 109 can cause a third-party service 209 associated with the email service profile 230 to perform. As described herein, such configuration information can include an icon, text, and executable code associated with each of the available actions. In one example, the executable code can include a network-accessible API of the third-party service 209, which the email client 109 can use to instruct the third-party service 209 to take the action defined by the API.

As an example, an email service profile 230 may be associated with a third-party service 209 that comprises an expense reporting service (e.g., Concur®). In such a case, the email service profile 230 may specify one or more actions that the email client 109 can cause to be taken at the expense reporting service in response to a particular API call defined by the email service profile 230. Examples of actions that an expense reporting service could be taken by the expense reporting service in response to a particular API call from the email client 109 include an action that causes a new expense report to be created that includes the pertinent information from a particular email message, an action that causes an existing expense report referenced by a particular email message to be approved or denied for payment authorization, and an action that causes a user-selected file to be uploaded to an existing expense report referenced by a particular email message.

As a further example, an email service profile 230 may be associated with a third-party service 209 that comprises a social media service (e.g., Facebook®). In such a case, the email service profile 230 may specify one or more actions that the email client 109 can cause to be taken at the social media service in response to a particular API call defined by the email service profile 230. Examples of actions that an expense reporting service could be taken by the social media service in response to a particular API call from the email client 109 include an action that causes a message defined by the user of the email client 109 to be posted to a particular post referenced by a particular email message, an action that causes a user-selected file to be uploaded to a particular social media page (e.g., profile, post, comment, photo album) referenced by a particular email message, an action that causes a "like" or other emotional reaction indicator to be posted to a particular social media page referenced by a particular email message, or an action that causes a user-selected privacy setting (e.g., non-public, public, hidden, deleted) to be applied to a particular social media page referenced by a particular email message.

Further, at step 407, the management component 231 can associate the email service profile 230 with the email client 109. In one example, the management component 231 can instruct one or more of the operating system of the client device 206 or a particular application on the client device 206 (e.g., email client 109) to associate the email service profile 230 with the email client 109. Alternatively, the operating system of the client device 206 can automatically associate the email service profile 230 with the email client 109 upon the installation of the configuration profile on the client device 206 or upon the extraction of the email service profile 230 from the configuration profile, either of which can be caused by the management component 231. In any case, the management component 231 can cause the email client 109 to conform its operations to the specifications of the email service profile 230 by causing settings associated with certain functionality of the email client 109 to conform with configuration information extracted from the email service profile 230. Thereafter, the process proceeds to completion.

Figure 5:
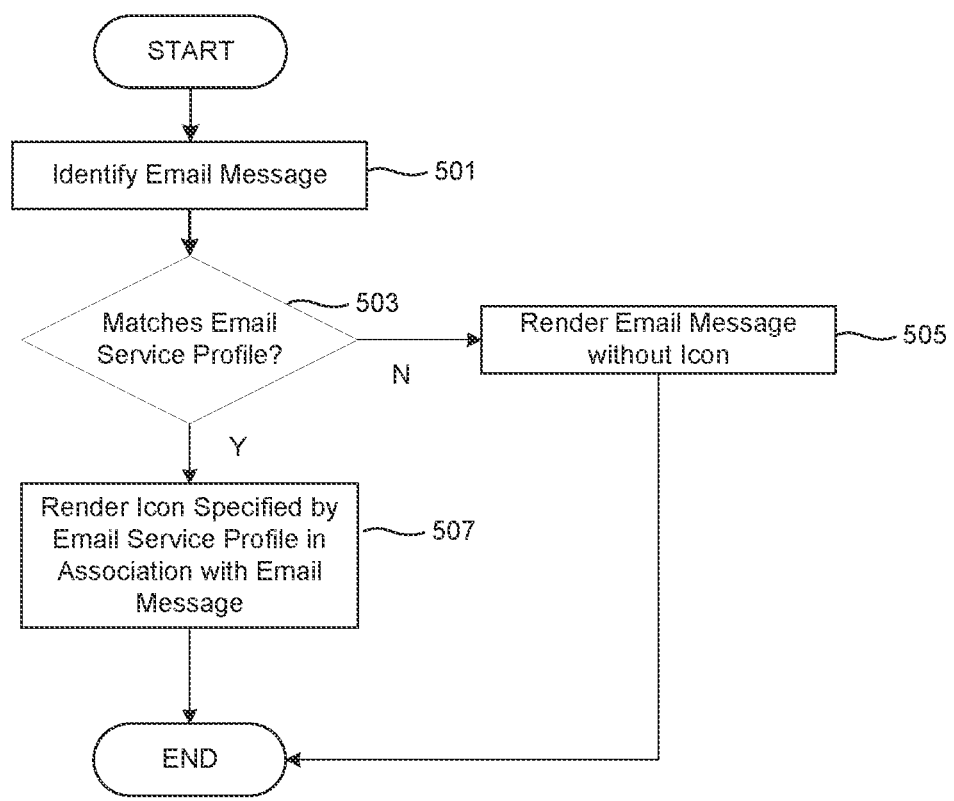

Referring next to FIG. 5, shown is a flowchart that provides one example of how the email client 109 can render each email message in a mailbox view of a plurality of emails associated with a user's mailbox.

First, at step 501, the email client 109 can identify an email message in the user's mailbox. In one example, the email client 109 can identify an email message that has been downloaded by and stored in a memory location of the client device 206 associated with the user's mailbox. Alternatively, the email client 109 can instruct a remote email service (e.g., Microsoft Exchange®) associated with the user's mailbox to identify an email message. For instance, the email client 109 can instruct the remote email service to transmit one or more email messages to the client device 206 that have yet to be transmitted to the client device 206 and/or be stored in a memory location of the client device 206.

At step 503, the email client 109 can determine whether the identified email message matches or corresponds to an email service profile 230 that is associated with a third-party service. As noted above, the email service profile 230 can define a regular expression or a text pattern in the subject or body of the email that indicates that the email message corresponds to a particular third-party service. The email service profile 230 could also or alternatively identify a particular sender or recipient address that indicates an email that corresponds to a particular third-party service. Accordingly, if the email message corresponds to a particular email service profile 230 at step 503, the process can proceed to step 507.

At step 507, the email client 109 can extract an icon corresponding to the third-party service from the email service profile 230 and can render the icon above, adjacent to, or otherwise associated with the email message in a user interface provided by at least one of the email client 109 or the operating system of the client device 206.

Returning to step 503, if the email message cannot be associated with an email service profile 230 (by virtue of the email message not corresponding to a particular third-party service, as defined by the email service profile 230), the process can proceed to step 505, where the email client 109 can render the email message without an icon specified by email service profile 230.

Figure 6:
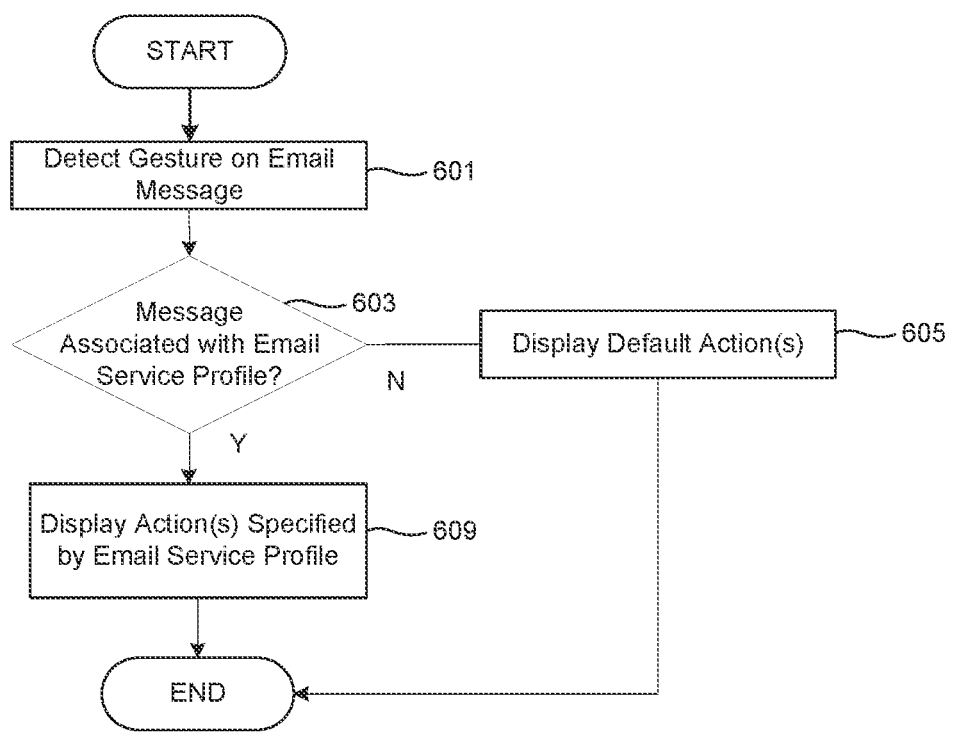

Referring next to FIG. 6, shown is a flowchart that provides one example of how an email client 109 can display actions specified by an email service profile 230 in an instance in which a user of the client device 206 performs a specified gesture using the client device 106 in association with a particular email message.

In one example, a specified gesture can be performed when the user of the client device 206 makes contact with a portion of a touchscreen display of the client device 206 using one or more fingers or other body parts of the user, such as by swiping a finger horizontally across the touchscreen display of the client device 206. In another example, a specified gesture can be performed when the user of the client device 206 changes the position of the client device 206 within a three-dimensional space, such as by shaking the client device 206. In another example, a specified gesture can be performed when the user of the client device 206 selects a particular menu option within the email client 109 using an input device or sensor of the client device 206 (e.g., touchscreen, microphone, camera, accelerometer, mouse, keyboard, fingerprint scanner). In another example, a specified gesture can be performed by a secondary device in communication with the client device 206, such as a smart watch, smart glasses, or another wearable computing device. In any case, a specified gesture can be performed in association with a particular email message when the specified gesture is performed at a time when the client device 106 is providing the user with access to the email message or when the specified gesture is targeted to the email message (e.g., an input to a portion of a touchscreen display of the client device 206 where a user interface element associated with the email message is being displayed).

Beginning at step 601, the email client 109 can detect that a specified gesture was or is being performed on the client device 206 in association with a particular email message. In one example, the email client 109 can request that an operating system of the client device 206 notify the email client 109 that a specified gesture has occurred on the client device 206. For instance, the email client 109 can request that the operating system of the client device 206 specify all sensor data of the client device 206 (e.g., touchscreen input data, accelerometer data, GPS or other location data, audio or video data), which the email client 109 can use to infer that a specified gesture has occurred. In the case of a swipe gesture, the email client 601 can be configured to only detect the gesture when a user of the client device 206 has swiped a minimum distance across the display of the client device 206.

Upon recognizing that a specified gesture has occurred, the email client 109 can determine whether there is a correlation between the specified gesture and a particular email message. In one example, the email client 109 can determine that there is a correlation when the specified gesture occurred while the email client 109 was providing access to a particular email message. In another example, the email client 109 can determine that there is a correlation when the specified gesture occurred within a configurable threshold distance of user interface element associated with a particular email message. For instance, the email client 109 can determine that there is a correlation when a swipe gesture occurred which began or ended within a configurable threshold distance of a user interface element associated with a particular email message.

Next, at step 603, the email client 109 can determine whether the email message matches or is correlated with an email service profile 230, as described above in the description regarding FIG. 5.

In one embodiment, when the email message does not correspond to a particular email service profile 230, the process can proceed to step 605, where the email client 109 can display a default set of actions. In one example, the default set of actions can be a single action, and the email client 109 can simply perform the action on the email message. In another example, the default set of actions can be a set of actions, and the email client 109 can display a user interface element that allows the user of the client device 206 to select one of the default actions associated with the email client 109. In this sense, a default set of actions represents actions that the email client 109 can natively take on an email message, such as deletion of the message, archiving the message, replying to the message, forwarding the message, etc.

In another embodiment, when the email message does correspond to an email service profile 230, the process can proceed from step 603 to step 609, where the email client 109 can display the actions that are specified by the email service profile 230. In one example, to display the actions specified by the email service profile 230, the email client 109 can display content retrieved from a URL specified by the email service profile 230 within a web view control or component. In another example, the email service profile 230 can identify particular native user interface controls that the email client 109 can display. The email service profile 230 can also identify icons and text that the email client 109 can display and that the user can select to choose a particular action. The actions specified by the email service profile 230 can represent actions that the email client 109 can take on behalf of the user on a particular data item in the third-party service using network-accessible API associated with the third-party service.

Figure 7:
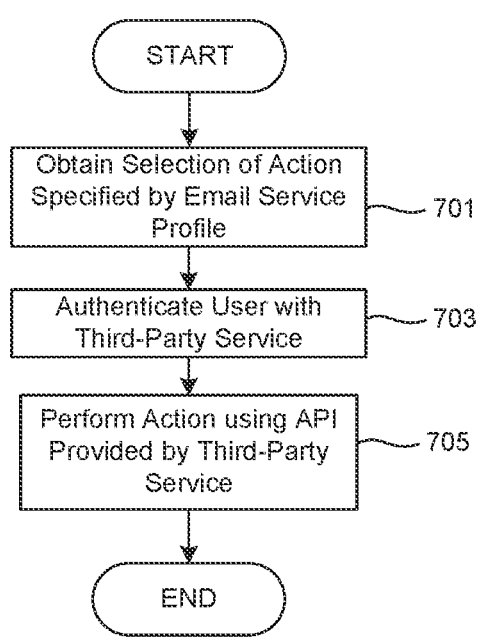
Figure 7:

Referring next to FIG. 7, shown is a flowchart that provides one example of how the email client 109 can perform a selected action specified by the email service profile 230 on behalf of a user within a third-party service.

Beginning at step 701, the email client 109 can obtain a selection of a particular action specified by the email service profile 230. As described herein, the email client 109 can obtain the selection of the particular action by identifying that a specified gesture has occurred that is associated with the particular action. In one example, the email client 109 can also extract an identifier for a data item in the third-party service 209 from the email message.

Next, at step 703, the email client 109 can authenticate with the third-party service. In one example, the email client 109 can authenticate with the third-party service 209 by using an authentication credential or authentication token extracted from the email service profile 230. In another example, the email client 109 can cause a user interface to be displayed through which a user of the email client 109 can input one or more credentials that can be used by the email client 109 to authenticate with the third-party service 209. In another example, the email client 109 can cause the operating system of the client device 206 to provide the email client 109 with sensor data (e.g., biometric credentials, location data) that can be used by the email client 109 to authenticate with the third-party service 209.

Then, at step 705, the email client 109 can perform the selected action on the data item corresponding to the email message on behalf of the user in the third-party service 209. The action can be performed on behalf of the user using a network-accessible API provided by the third-party service 209. Thereafter, the process can proceed to completion.

The flowcharts of FIGS. 3-7 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-7 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 206, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 212, email client 109, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system comprising:
    at least one computing device comprising a processor and a memory; and
    a management service executable by the at least one computing device, the management service causing the at least one computing device to at least:
        initiate enrollment of a client device with the management service as a managed device;
        initiate installation of an email client on the client device, wherein the email client is installed as a managed application that is managed by the management service;
        generate an email service profile associated with a third-party service, wherein the email service profile specifies text that the email client can use to identify an email associated with the third-party service; and
        initiate installation of the email service profile on the client device by the management service.

2. The system of claim 1, wherein the email service profile comprises an authentication credential associated with the third-party service, wherein the email client can authenticate the client device with the third-party service.

3. The system of claim 1, wherein the email service profile comprises a regular expression that the email client can apply to identify an email associated with the third-party service.

4. The system of claim 1, wherein the email service profile comprises an icon that the email client can display in association with the email message within a user interface of the email client.

5. The system of claim 1, wherein the email service profile is installed as a configuration profile on the client device, wherein the configuration profile is installed through a management application programming interface (API) provided by an operating system of client device, the management API accessible by a management component installed on the client device with elevated privileges.

6. The system of claim 1, wherein the email service profile defines at least one action that can be taken with respect to the email, wherein the at least one action is specific to the third-party service, and the email service profile further specifies a messaging protocol between the email client and the third-party service.

7. The system of claim 6, wherein the email service profile further comprises an extensible markup language (XML) file that specifies native user interface controls provided by an operating system of the client device that the email client renders to facilitate selection of the at least one action.

8. A method comprising:
    initiating enrollment of a client device with the management service as a managed device;
    initiating installation of an email client on the client device, wherein the email client is installed as a managed application that is managed by the management service;
    generating an email service profile associated with a third-party service, wherein the email service profile specifies text that the email client can use to identify an email associated with the third-party service; and
    initiating installation of the email service profile on the client device by the management service.

9. The method of claim 8, wherein the email service profile comprises an authentication credential associated with the third-party service, wherein the email client can authenticate the client device with the third-party service.

10. The method of claim 8, wherein the email service profile comprises a regular expression that the email client can apply to identify an email associated with the third-party service.

11. The method of claim 8, wherein the email service profile comprises an icon that the email client can display in association with the email message within a user interface of the email client.

12. The method of claim 8, wherein the email service profile is installed as a configuration profile on the client device, wherein the configuration profile is installed through a management application programming interface (API) provided by an operating system of client device, the management API accessible by a management component installed on the client device with elevated privileges.

13. The method of claim 8, wherein the email service profile defines at least one action that can be taken with respect to the email, wherein the at least one action is specific to the third-party service, and the email service profile further specifies a messaging protocol between the email client and the third-party service.

14. The method of claim 13, wherein the email service profile further comprises an extensible markup language (XML) file that specifies native user interface controls provided by an operating system of the client device that the email client renders to facilitate selection of the at least one action.

15. A non-transitory computer-readable medium comprising machine-readable instructions, wherein when executed by a processor of a computing device, the machine-readable instructions cause the computing device to at least:
   initiate enrollment of a client device with the management service as a managed device;
   initiate installation of an email client on the client device, wherein the email client is installed as a managed application that is managed by the management service;
   generate an email service profile associated with a third-party service, wherein the email service profile specifies text that the email client can use to identify an email associated with the third-party service; and
   initiate installation of the email service profile on the client device by the management service.

16. The non-transitory computer-readable medium of claim 15, wherein the email service profile comprises an authentication credential associated with the third-party service, wherein the email client can authenticate the client device with the third-party service.

17. The non-transitory computer-readable medium of claim 15, wherein the email service profile comprises a regular expression that the email client can apply to identify an email associated with the particular third-party service.

18. The non-transitory computer-readable medium of claim 15, wherein the email service profile comprises an icon that the email client can display in association with the email message within a user interface of the email client.

19. The non-transitory computer-readable medium of claim 15, wherein the email service profile is installed as a configuration profile on the client device, wherein the configuration profile is installed through a management application programming interface (API) provided by an operating system of client device, the management API accessible by a management component installed on the client device with elevated privileges.

20. The non-transitory computer-readable medium of claim 15, wherein the email service profile defines at least one action that can be taken with respect to the email, wherein the at least one action is specific to the particular third-party service and the email service profile further specifies a messaging protocol between the email client and the third-party service.

* * * * *